(12) United States Patent
Baek et al.

(10) Patent No.: US 10,254,470 B2
(45) Date of Patent: Apr. 9, 2019

(54) DISPLAY DEVICE AND METHOD OF MANUFACTURING THE SAME

(71) Applicant: Samsung Display Co., Ltd., Yongin-Si, Gyeonggi-Do (KR)

(72) Inventors: Myunghun Baek, Yongin-si (KR); Taechang Kim, Anyang-si (KR); Dongcheol Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 192 days.

(21) Appl. No.: 15/196,204

(22) Filed: Jun. 29, 2016

(65) Prior Publication Data

US 2017/0123144 A1    May 4, 2017

(30) Foreign Application Priority Data

Nov. 3, 2015 (KR) ........................ 10-2015-0154074

(51) Int. Cl.
| | | |
|---|---|---|
| *G02F 1/13357* | (2006.01) | |
| *G02B 6/00* | (2006.01) | |
| *F21V 8/00* | (2006.01) | |
| *G02F 1/1333* | (2006.01) | |

(52) U.S. Cl.
CPC ........... *G02B 6/0088* (2013.01); *G02B 6/005* (2013.01); *G02B 6/0083* (2013.01); *G02F 1/133305* (2013.01); *G02F 1/133308* (2013.01); *G02F 2001/133317* (2013.01); *G02F 2201/56* (2013.01); *G02F 2202/28* (2013.01)

(58) Field of Classification Search
CPC ....... G02B 6/0096; G02F 2001/133317; G02F 2001/133308; G02F 2001/133608

USPC ..................... 362/632–634; 349/58
See application file for complete search history.

(56) References Cited

U.S. PATENT DOCUMENTS

| | | | | |
|---|---|---|---|---|
| 6,445,430 B1* | 9/2002 | Sakamoto | ............. | G02F 1/1335 369/62 |
| 7,153,018 B2* | 12/2006 | Nomura | ................ | G02F 1/1333 362/634 |
| 8,147,113 B2* | 4/2012 | Hamada | .................... | F21V 7/04 362/631 |
| 2003/0179580 A1* | 3/2003 | Ito | ............................ | F21V 7/04 362/306 |
| 2007/0086214 A1* | 4/2007 | Wu | .......................... | F21V 7/04 663/634 |
| 2012/0242925 A1* | 3/2012 | Watanabe | ........... | G02F 1/13357 349/58 |
| 2014/0133073 A1 | 5/2014 | Ahn et al. | | |

(Continued)

FOREIGN PATENT DOCUMENTS

| | | |
|---|---|---|
| JP | 2013003487 A | 1/2013 |
| KR | 1020140021333 A | 2/2014 |

*Primary Examiner* — Julie A Bannan
(74) *Attorney, Agent, or Firm* — Cantor Colburn LLP

(57) ABSTRACT

A display device includes a light source, a light guide plate including a light incident surface facing the light source, a middle chassis disposed on the light guide plate, and a display panel disposed on the middle chassis. The middle chassis includes a first portion and a connection portion extending from an end of the first portion, and a second portion extending from the connection portion. The second portion is spaced apart from at least a portion of the first portion in a vertical direction, and overlaps the portion of the first portion in the vertical direction.

20 Claims, 9 Drawing Sheets

(56) References Cited

U.S. PATENT DOCUMENTS

2014/0176852 A1\* 6/2014 Ha .................... G02F 1/133308
349/58

\* cited by examiner

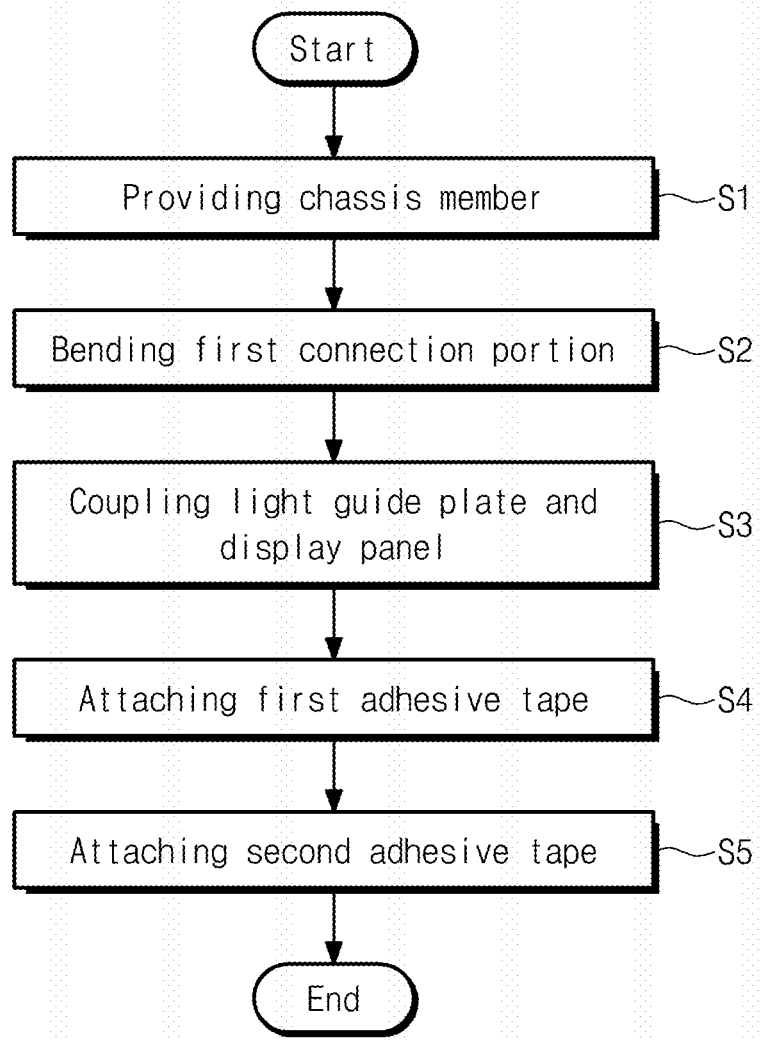

DISPLAY DEVICE AND METHOD OF MANUFACTURING THE SAME

This application claims priority to Korean Patent Application No. 10-2015-0154074, filed on Nov. 3, 2015, and all the benefits accruing therefrom under 35 U.S.C. § 119, the content of which in its entirety is herein incorporated by reference.

BACKGROUND

1. Field

The disclosure relates to a display device and a method of manufacturing the display device. More particularly, the disclosure relates to a display device including a display panel and a light guide plate, which have a constant curvature, and a method of manufacturing the display device.

2. Description of the Related Art

As a display device, a flat panel display device is widely used since the flat panel display device has desired features, such as a large screen size, being lightweight etc. A liquid crystal display device is extensively used among flat panel display devices. In recent years, demand continues to increase for a flexible liquid crystal display, which is thin and curved.

SUMMARY

The disclosure provides a display device including a display panel and a light guide plate, which have a constant curvature.

The disclosure provides a method of manufacturing the display device.

An embodiment of the inventive concept provides a display device including a light source, a light guide plate including a light incident surface facing the light source, a middle chassis disposed on the light guide plate, and a display panel disposed on the middle chassis. In such an embodiment, the middle chassis includes a first portion, a second portion extending from a first end of the first portion and overlapping at least a portion of the first portion in a vertical direction, and a connection portion connecting the first portion and the second portion. In such an embodiment, the first portion is spaced apart from the second portion in the vertical direction.

In an embodiment, the connection portion may be curved around a reference axis defined between the first portion and the second portion.

In an embodiment, the light source may be disposed at a position adjacent to a side of the light guide plate, the first portion may overlap the light source in the vertical direction, and the second portion may be spaced apart from the light source when viewed in a plan view.

In an embodiment, the display device may further include a circuit board including a mounting surface on which the light source is disposed. In such an embodiment, a first end of the second portion may be connected to the connection portion, and a second end of the second portion may be disposed between a first imaginary surface extending from the light incident surface in the vertical direction and a second imaginary surface extending from the mounting surface in the vertical direction when viewed in a plan view.

In an embodiment, the display device may further include a first adhesive tape and a second adhesive tape. In such an embodiment, the first portion may be disposed on the second portion, a surface of the first adhesive tape may be attached to the light guide plate, an opposing surface of the first adhesive tape may be attached to the second portion, a surface of the second adhesive tape may be attached to the display panel, and an opposing surface of the second adhesive tape may be attached to the first portion.

In an embodiment, the middle chassis may further include a third portion extending from the second portion and overlapping the first and second portions in the vertical direction.

In an embodiment, the second portion may be disposed between the first and third portions.

In an embodiment, the display device may further include a first connection portion connecting the first portion and the second portion and a second connection portion connecting the second portion and the third portion. In such an embodiment, the first connection may be curved around a first reference line defined between the first portion and the second portion, and the second connection may be curved around a second reference line defined between the second portion and the third portion.

In an embodiment, the display device may further include a bottom chassis which defines an accommodating space to accommodate the light guide plate and the light source. In such an embodiment, the middle chassis may further include an engaging portion extending from a second end of the first portion and engaged with the bottom chassis.

In an embodiment, the engaging portion may include a first engaging portion, and a second engaging portion extending from the first engaging portion and overlapping at least a portion of the first engaging portion in a horizontal direction. In such an embodiment, the bottom chassis may include a third engaging portion and a fourth engaging portion extending from the third engaging portion and overlapping at least a portion of the third engaging portion in the horizontal direction, where the second engaging portion may be engaged with the fourth engaging portion.

In an embodiment, the display device may further include a circuit board on which the light source is disposed, and the circuit board is coupled to the third engaging portion.

In an embodiment, the first portion may have a thickness different from a thickness of the engaging portion.

An embodiment of the inventive concept provides a backlight unit including a light source, a light guide plate including a light incident surface facing the light source, a bottom chassis which defines an accommodating space to accommodate the light guide plate and the light source, and a middle chassis disposed on the light guide plate. In such an embodiment, the middle chassis includes a first portion, a second portion extending from a first end of the first portion, spaced apart from at least a portion of the first portion in a vertical direction, and overlapping at least a portion of the first portion in the vertical direction, a connection portion connecting the first portion and the second portion, and an engaging portion extending from a second end of the first portion and engaged with the bottom chassis.

In an embodiment, the backlight unit may further include an adhesive tape. In such an embodiment, the first portion may be disposed above the second portion, a surface of the adhesive tape may be attached to the light guide plate, and an opposing surface of the adhesive tape may be attached to the second portion.

In an embodiment, the backlight unit may further include an adhesive tape. In such an embodiment, the first portion may be disposed under the second portion, a surface of the adhesive tape may be attached to the light guide plate, and an opposing surface of the adhesive tape may be attached to the first portion.

In an embodiment, the backlight unit may further include a plurality of optical sheets. In such an embodiment, the plurality of optical sheets may be disposed above the light guide plate and spaced apart from the first and second portions when viewed in a plan view.

In an embodiment, the middle chassis may further include a third portion extending from the second portion and overlapping the first and second portions in the vertical direction.

An embodiment of the inventive concept provides a method of manufacturing a display device, the method including providing a chassis member, forming a middle chassis from the chassis member, and coupling the middle chassis to a light guide plate and a display panel in way such that the middle chassis overlaps an end of the light guide plate and an end of the display panel in a vertical direction. In such an embodiment, the forming the middle chassis includes bending the chassis member to define a first connection portion connecting a first portion and a second portion in way such that the first portion of the chassis member overlaps the second portion of the chassis member in the vertical direction.

In an embodiment, the first portion may be disposed on the second portion, and the coupling the middle chassis may include attaching a surface of a first adhesive tape to the light guide plate, attaching an opposing surface of the first adhesive tape to the second portion, attaching a surface of a second adhesive tape to the display panel, and attaching an opposing surface of the second adhesive tape to the first portion. The first portion is disposed above the second portion by the bending of the first connection portion.

In an embodiment, the forming the middle chassis may further include bending the chassis member to define a second connection portion connecting the second portion and a third portion in a way such that the third portion overlaps the first and second portions in the vertical direction.

According to embodiments described herein, the middle chassis includes the first portion, the second portion, and the connection portion. In such embodiment, the middle chassis having a structure, e.g., a double-chassis or a triple-chassis structure, in which the first portion overlaps the second portion in the vertical direction, is disposed between the display panel and the light guide plate. Therefore, in such embodiments, the middle chassis applies a tensile force to the display panel and the light guide plate in a direction to offset a restoration force of the curved display panel and the curved light guide plate, in which the display panel and the light guide plate tend to return to their original shapes, and thus the curved display device, e.g., a large-size curved display device in which a relatively large restoration force is generated, may be easily realized.

BRIEF DESCRIPTION OF THE DRAWINGS

The above and other features of the disclosure will become readily apparent by reference to the following detailed description when considered in conjunction with the accompanying drawings wherein:

FIG. 8 is a flowchart showing an embodiment of a method of manufacturing a display device.

DETAILED DESCRIPTION

Figure 1A:
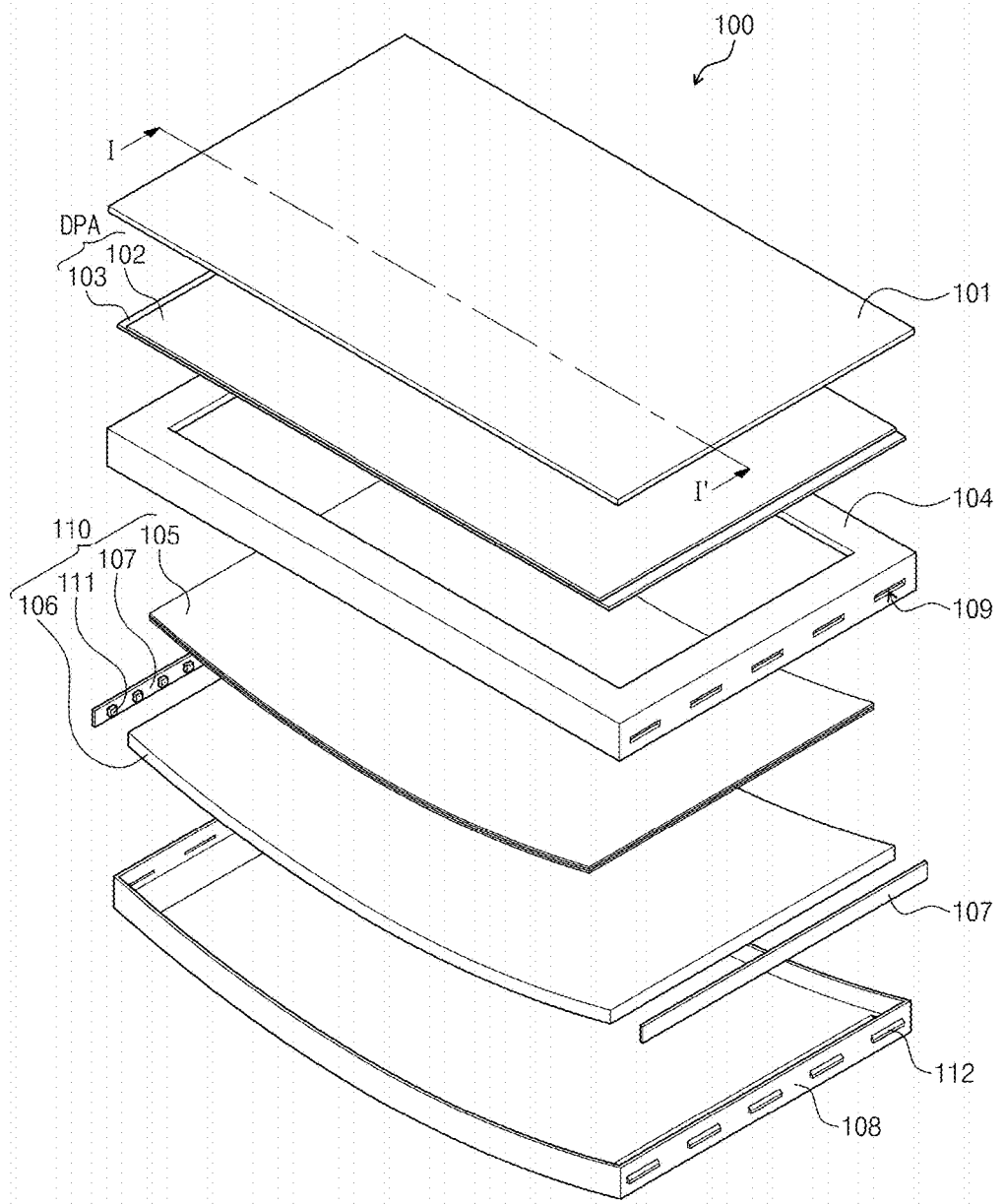
FIG. 1A is an exploded perspective view showing a display device according to an exemplary embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. Or" means "and/or." As used herein, the term "and/or" includes any and all combinations of one or more of the associated listed items. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be described in detail with reference to the accompanying drawings.

Figure 1B:
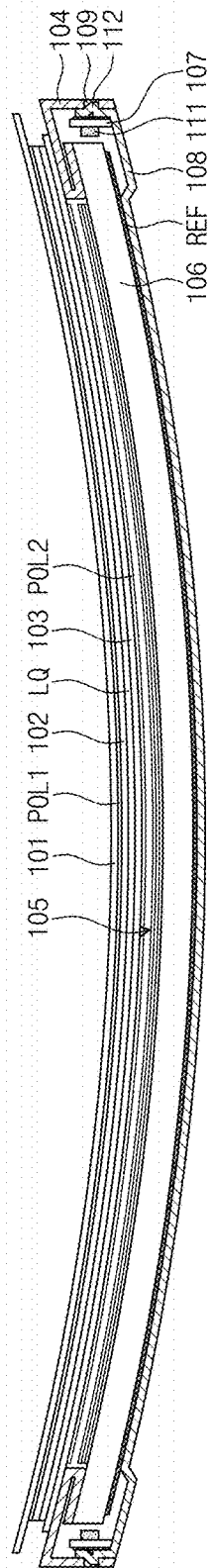
FIG. 1B is a cross-sectional view showing the display device of FIG. 1A in an assembled state.

FIG. 1A is an exploded perspective view showing a display device 100 according to an exemplary embodiment of the disclosure, and FIG. 1B is a cross-sectional view showing the display device 100 of FIG. 1A in an assembled state.

Referring to FIG. 1A, an exemplary embodiment of the display device 100 includes a window 101, a display panel DPA, a middle chassis 104, a backlight unit 110, and a bottom chassis 108.

The window 101 may be substantially flat or have a substantially plate shape. The window 101 is substantially transparent and includes a glass or a transparent polymer.

The display panel DPA is disposed under the window 101. In an exemplary embodiment, the window 101 includes a display area (not shown) and a non-display area (not shown) and is disposed on the display panel DPA to cover the display panel DPA. The window 101 protects the display panel DPA from external impacts.

The display panel DPA includes a lower substrate 103, an upper substrate 102 disposed on the lower substrate 103 to face the lower substrate 103, and a liquid crystal layer LQ (refer to FIG. 2) disposed between the upper substrate 102 and the lower substrate 103. In an exemplary embodiment, the upper substrate 102 has an area smaller than that of the lower substrate 103, as shown in FIG. 1A. In such an embodiment, a portion of the upper substrate 102, which is not covered by the lower substrate 103, is exposed, and a pad part is disposed on the exposed portion of the upper substrate 102.

The lower substrate 103 includes switching devices, e.g., thin film transistors (not shown), arranged thereon substantially in a matrix form. Each thin film transistor includes a source terminal connected to a data line (not shown), a gate terminal connected to a gate line (not shown), and a drain terminal that is transparent and connected to a pixel electrode having conductivity.

The upper substrate 102 includes a common electrode disposed thereon to face the pixel electrode disposed on the lower substrate 103. The common electrode includes a transparent conductive material.

When a gate voltage is applied to the gate terminal of the thin film transistor through the gate linen and the thin film transistor is thereby turned on in the display panel DPA, an electric field is generated between the pixel electrode and the common electrode. Due to the electric field, an arrangement of liquid crystal molecules of the liquid crystal layer LQ disposed between the lower substrate 103 and the upper substrate 102 is changed and a transmittance of light traveling through the liquid crystal layer LQ is changed, thereby displaying a desired image through the window 101.

The middle chassis 104 is disposed under the display panel DPA.

The middle chassis 104 includes a plurality of engaging recesses 109, which are engaged with a plurality of engaging hooks 112 of the bottom chassis 108. In one exemplary embodiment, for example, the middle chassis 104 has a substantially rectangular shape defined with long sides and short sides when viewed in a plan view. The engaging recesses 109 are arranged in a direction substantially parallel to the short sides and arranged on a side surface of the middle chassis 104, which extends downward from the short sides.

The middle chassis 104 includes a metal material. In one exemplary embodiment, for example, the middle chassis 104 includes aluminum (Al), iron (Fe), copper (Cu), a compound thereof, or a mixture thereof.

The backlight unit 110 includes a light guide plate 106, a plurality of light sources 111 disposed to face a side surface of the light guide plate 106, a circuit board 107 including a mounting surface LF (refer to FIG. 2) on which the light sources 111 are disposed or mounted, and a plurality of optical sheets 105 disposed between the display panel DPA and the light guide plate 106.

In one exemplary embodiment, for example, the backlight unit 110 may be, but not limited to, an edge-illumination type backlight unit. In such an embodiment, the light sources 111 may be disposed adjacent to a light incident surface of the light guide plate 106 and a side surface opposite to the light incident surface of the light guide plate 106.

FIG. 1A shows an exemplary embodiment, where the edge-illumination type backlight unit in which the light sources 111 are disposed adjacent to a side surface of the light guide plate 106 and an opposing side surface opposite to the side surface of the light guide plate 106.

In an exemplary embodiment, as shown in FIG. 1A, the circuit board 107 may extend along a side surface of the light guide plate 106, and the light sources 111 are arranged on the circuit board 107 along the extending direction of the circuit board 107.

The light guide plate 106 has a substantially rectangular shape defined with long sides and short sides when viewed in a plan view. The light incident surface of the light guide plate 106 faces the light sources 111. The light guide plate 106 receives the light emitted from the light sources 111 through the light incident surface and guides the light to convert the light to a surface light. The light guide plate 106 provides the converted surface light to a rear side of the plurality of optical sheets 105.

The plurality of optical sheets 105 is disposed above the light guide plate 106. The plurality of optical sheets 105 improves an efficiency of the light provided from the light guide plate 106. In an exemplary embodiment, the plurality of optical sheet 105 include a diffusion sheet to diffuse the light exiting from the light guide plate 106 and a prism sheet to condense the diffused light. In one exemplary embodiment, for example, the prism sheet includes a horizontal prism sheet and a vertical prism sheet. The horizontal prism sheet includes a plurality of prisms extending in a direction different from a direction in which the vertical prism sheet extends.

The diffusion sheet, the vertical prism sheet and the horizontal prism sheet may be sequentially disposed or stacked on one another.

The bottom chassis 108 is disposed under the backlight unit 110.

In an exemplary embodiment, an accommodating space defined in the bottom chassis 108 to accommodate the light guide plate 106 and the light sources 111. The bottom chassis 108 includes the engaging hooks 112 as described above. The engaging hooks 112 are disposed at positions corresponding to those of the engaging recesses 109 such that the engaging hooks 112 are respectively engaged with the engaging recesses 109.

Therefore, similar to the engaging recesses 109, the engaging hooks 112 are arranged on the side surface of the bottom chassis 108 in the direction substantially parallel to the short sides.

The bottom chassis 108 includes a metal material. In one exemplary embodiment, for example, the bottom chassis 108 includes aluminum (Al), iron (Fe), copper (Cu), a compound thereof, or a mixture thereof.

FIG. 1B shows a cross-sectional view taken along line I-I' of the display device shown in FIG. 1A in an assembled state. Referring to FIG. 1B, an exemplary embodiment of the display device 100 may be, but not limited to, a curved display device having a curved shape. In an exemplary embodiment, as shown in FIG. 1B, the curved display device is curved to be convex in a lower direction, but not being limited thereto or thereby. In an alternative exemplary embodiment, the display device 100 may be applied to a curved display device curved to be convex in an upper direction. In another alternative exemplary embodiment, the display device 100 may be a flat panel display device.

In an exemplary embodiment, elements of the display device, e.g., the light guide plate and the display panel, may have a flat shape in an initial state. The curved shape of the elements may be secured by bending the elements in the initial state. When the elements having a flat shape in the initial states are curved, a restoration force is generated in the elements. The restoration force allows the elements to tend to have the flat shape. The restoration force may be eliminated by the middle chassis 104. This will be described in detail later.

The curved shape of the light guide plate 106 and the display panel DPA may be maintained by using the middle chassis 104 coupled to the bottom chassis 108.

Figure 2:
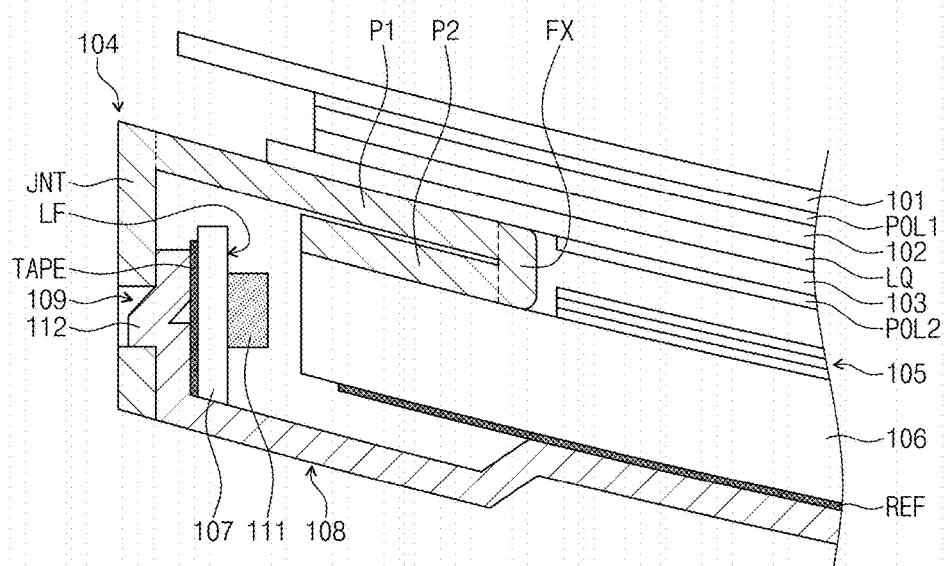
FIG. 2 is a partially enlarged view showing the display device shown in FIG. 1B.

FIG. 2 is a partially enlarged view showing the display device shown in FIG. 1B.

Referring to FIG. 2, a first polarizing plate POL1 is provided between the display panel DPA and the window 101. The first polarizing plate POL1 has a first polarizing axis (not shown). The first polarizing plate POL1 polarizes the light exiting from the display panel DPA in a direction substantially parallel to the first polarizing axis.

A second polarizing plate POL2 is disposed under the display panel DPA. In one exemplary embodiment, for example, the second polarizing plate POL2 is attached to a lower surface of the lower substrate 103. The second polarizing plate POL2 is interposed between the lower substrate 103 and the plurality of optical sheets 105. The second polarizing plate POL2 has a second polarizing axis (not shown). The second polarizing plate POL2 polarizes the light exiting from the plurality of optical sheets 105 in a direction substantially parallel to the second polarizing axis.

The first polarizing axis may be substantially perpendicular to the second polarizing axis.

A reflective film REF is disposed under the light guide plate 106. In one exemplary embodiment, for example, the reflective film REF is interposed between the light guide plate 106 and the bottom chassis 108 and attached to a lower surface of the light guide plate 106. The reflective film REF reflects a light leaking from the light guide plate 106 to the reflective film REF among the light incident to the light guide plate 106 to the upper direction, and thus the efficiency of the light is improved.

The middle chassis 104 includes a first portion P1, a connection portion FX extending downwardly from one end, e.g., a first end, of the first portion P1, a second portion P2 extending from the connection portion FX and overlapping at least a portion of the first portion P1 in a vertical direction, and an engaging portion JNT extending from another end, e.g., a second end opposite to the first end, of the first portion P1 and engaged with the bottom chassis 108.

The first portion P1 overlaps the light source 111 when viewed in a vertical direction. In such an embodiment, a portion of the first portion P1 is disposed above the light source 111.

In one exemplary embodiment, for example, a portion of the connection portion FX has a curved shape. In such an embodiment, the connection portion FX has a curved surface that is curved around or with respect to a reference line (not shown), which is defined between the first and second portions P1 and P2 and substantially parallel to the direction substantially parallel to the short sides.

The curved surface may be substantially parallel to the direction substantially parallel to the short sides. The shape of the connection portion FX should not be limited to that shown in FIG. 2 and may be curved to have a variety of shapes around the reference line.

In an exemplary embodiment, as shown in FIG. 2, at least a portion of the first portion P1 is disposed above the second portion P2. In such an embodiment, the second portion P2 is spaced apart from the portion of the first portion P1 by a predetermined distance in the vertical direction.

The portion of the first portion P1 overlaps the light guide plate 106 in the vertical direction, and substantially overlaps the second portion P2 in the vertical direction, and a portion of the second portion P2 overlaps the light guide plate 106.

In one exemplary embodiment, for example, an upper surface of the first portion P1 may be in contact with the lower surface of the lower substrate 103 as shown in FIG. 2. A lower surface of the second portion P2 may be in contact with a portion of an upper surface of the light guide plate 106. The connection portion FX may be in contact with a portion of the lower surface of the lower substrate 103 and a portion of the upper surface of the light guide plate 106. In such an embodiment, an upper surface of the connection portion FX may be in contact with the portion of the lower surface of the lower substrate 103, and a lower surface of the connection portion FX may be in contact with the portion of the upper surface of the light guide plate 106.

FIG. 2 shows an exemplary embodiment of the display device 100 in which the second portion P2 is in contact with the portion of the light guide plate 106 in the vertical direction, but not being limited thereto or thereby.

In one exemplary embodiment, for example, an end of the second portion P2 is disposed on a first imaginary surface (not shown) extending from the light incident surface in the vertical direction or between the first imaginary surface (and a second imaginary surface (not shown) extending from the mounting surface LF of the circuit board 107 in the vertical direction In an exemplary embodiment, the first portion P1 overlaps the light source 111 in the vertical direction, and the second portion P2 is spaced apart from the light source 111 when viewed in a plan view and does not overlap the light source 111 in the vertical direction.

In such an embodiment, the first and second portions P1 and P2 are spaced apart from the plurality of optical sheets 105 when viewed in a plan view, e.g., in a thickness direction of the display device 100. The connection portion FX may be spaced apart from the plurality of optical sheets 105 when viewed in the plan view.

The bottom chassis 108 is coupled to the circuit board 107. In one exemplary embodiment, for example, the bottom chassis 108 is coupled to the circuit board 107 by an adhesive member TAPE disposed therebetween.

In an exemplary embodiment, as described above, the bottom chassis 108 includes the engaging hooks 112, and as shown in FIG. 2, the engaging hooks 112 are respectively engaged with the engaging recesses 109. Thus, the middle chassis 104 is coupled to the bottom chassis 108.

In such an embodiment, where the middle chassis 104 and the bottom chassis 108 are coupled to each other using the engaging hooks 112 and the engaging recesses 109, the middle chassis 104 is fixed to the bottom chassis 108 and effectively prevented from being separated from the bottom chassis 108 even though external impacts are applied to the middle chassis 104. Accordingly, an outline of the display device 100 may be defined by the middle chassis 104 disposed at an outermost position of the display device 100 as shown in FIG. 2.

In such an embodiment, the middle chassis 104 includes the first portion P1, the second portion P2 and the connection portion FX, as described above, such that the middle chassis 104 may perform a function of a mold frame of a conventional display device. In such an embodiment, the middle chassis 104 may have improved functions compared with the mold frame of the conventional display device.

In such an embodiment, the middle chassis 104 has a double-chassis structure, in which the first and second portions P1 and P2 are disposed to overlap each other in the vertical direction, and is disposed between the display panel DPA and the light guide plate 106. Therefore, the middle chassis 104 provides the display panel and the light guide plate with a tensile force to offset the restoration force in which the curved display panel and the curved light guide plate tend to return to their original shapes or a flat shape, and thus the curved display device, e.g., a large-size curved display device in which a relatively large restoration force is generated, may be effectively realized.

In a conventional display device, where the mold frame has a relatively small strength compared with a chassis, the large-size curved display device may not be effectively realized. In an exemplary embodiment, where the middle chassis 104 including the first portion P1, the second portion P2 and the connection portion FX is provided instead of the conventional mold frame as described above, the large-size curved display device may be effectively realized FIG. 3 is a partially enlarged view showing a display device according to an alternative exemplary embodiment of the disclosure.

Figure 3:
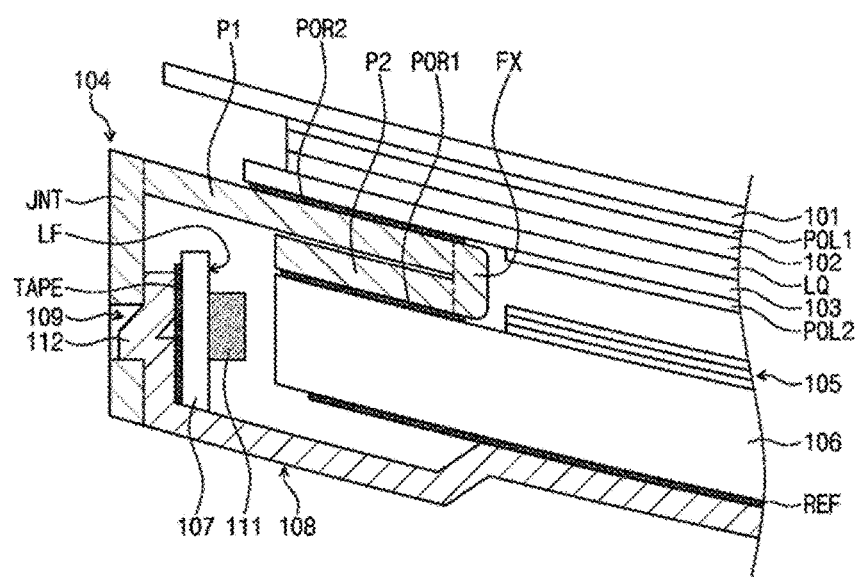
FIG. 3 is a partially enlarged view showing a display device according to an alternative exemplary embodiment of the disclosure.

The display device in FIG. 3 is substantially the same as the display device shown in FIG. 2 except for adhesive tapes. The same or like elements shown in FIG. 3 have been labeled with the same reference characters as used above to describe the exemplary embodiments of the display device shown in FIG. 2, and any repetitive detailed description thereof will hereinafter be omitted or simplified.

In an exemplary embodiment, as shown in FIG. 3, the display device 100 may further include a first adhesive tape POR1 and a second adhesive tape POR2.

In such an embodiment, as shown in FIG. 3, a surface of the first adhesive tape POR1 is attached to the light guide plate 106, and an opposing surface of the first adhesive tape POR1 is attached to the second portion P2. In one exemplary embodiment, for example, the surface of the first adhesive tape POR1 is attached to an upper surface of the light guide plate 106 and the opposing surface of the first adhesive tape POR1 is attached to a lower surface of the second portion P2.

In such an embodiment, a surface of the second adhesive tape POR2 is attached to the display panel DPA and an opposing surface of the second adhesive tape POR2 is attached to the first portion P1. In one exemplary embodiment, for example, the surface of the second adhesive tape POR2 is attached to a rear surface of the lower substrate 103 of the display panel DPA and the opposing surface of the second adhesive tape POR2 is attached to an upper surface of the first portion P1.

In an exemplary embodiment, the first and second adhesive tapes POR1 and POR2 may be, but not limited to, a tape containing phorone.

In such an embodiment, as described above, a middle chassis 104 includes the first and second adhesive tapes POR1 and POR2, such that the display panel DPA and the light guide plate 106 may be more effectively securely coupled to and fixed to the middle chassis 104. Accordingly, the tensile force may be applied to the display panel DPA and the light guide plate 106 to offset the above-mentioned restoration force, and thus the curved shape of the display panel DPA and the light guide plate 106 may be stably maintained.

Figure 4:
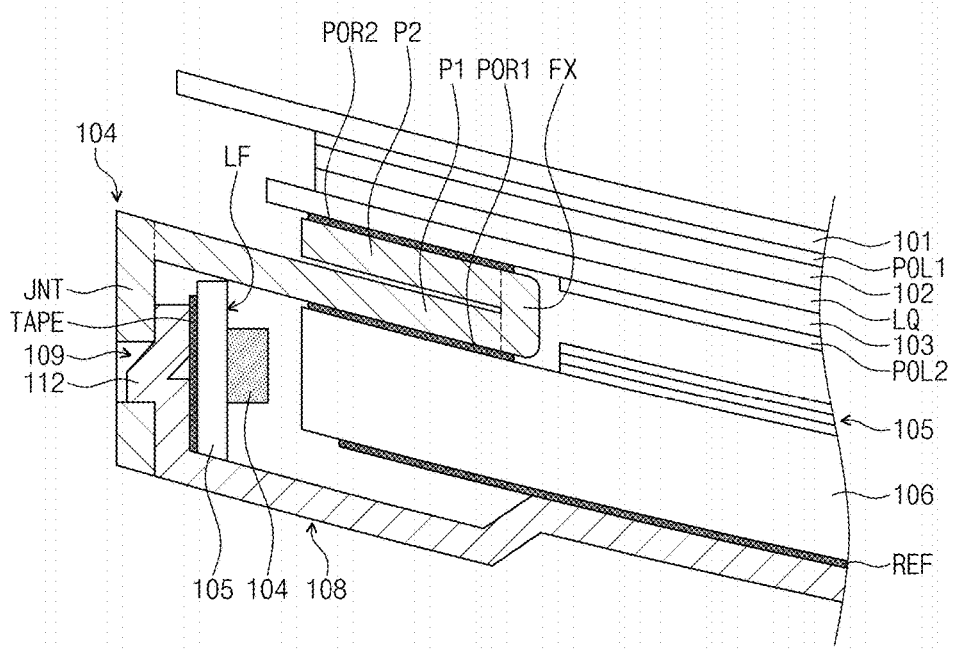
FIG. 4 is a partially enlarged cross-sectional view showing a display device according to another alternative exemplary embodiment of the disclosure.

FIG. 4 is a partially enlarged cross-sectional view showing a display device according to another alternative exemplary embodiment of the disclosure.

The display device in FIG. 4 is substantially the same as the display device shown in FIG. 3 except for the first and second portions. The same or like elements shown in FIG. 4 have been labeled with the same reference characters as used above to describe the exemplary embodiments of the display device shown in FIGS. 2 and 3, and any repetitive detailed description thereof will hereinafter be omitted or simplified.

In an exemplary embodiment, the second portion P2 is disposed above the first portion P1 as shown in FIG. 4. A middle chassis 104 shown in FIG. 4 may have the double-chassis structure in which the first portion P1 is disposed to overlap the second portion P2 in the vertical direction. Other elements of the display device shown in FIG. 4 have the same structure and function as those of the display device 100 shown in FIG. 3. Therefore, the double-chassis structure may provide the same effect as the above-mentioned effects.

Figure 5:
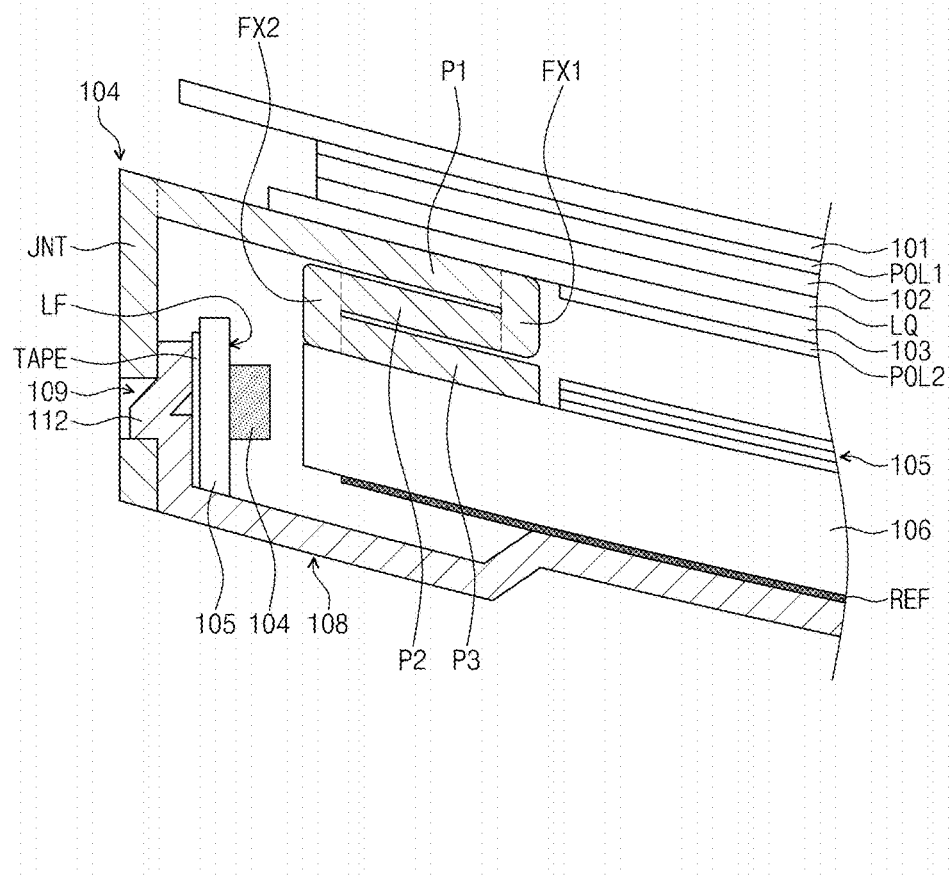
FIG. 5 is a partially enlarged cross-sectional view showing a display device according to another alternative exemplary embodiment of the disclosure.

FIG. 5 is a partially enlarged cross-sectional view showing a display device according to another alternative exemplary embodiment of the disclosure.

Referring to FIG. 5, a middle chassis 104 includes the first portion P1, the second portion P2, a third portion P3 extending from the second portion P2 and overlapping the first and second portions P1 and P2 in the vertical direction, a first connection portion FX1 connecting the first portion P1 and the second portion P2, a second connection portion FX2 connecting the second portion P2 and the third portion P3, and the engaging portion JNT.

The middle chassis 104 of the display device 100 has a different structure from that of the display device 100 shown in FIG. 2. In such an embodiment, the connection portion FX shown in FIG. 2 corresponds to the first connection portion FX1, and the middle chassis 104 shown in FIG. 5 further includes the third portion P3 and the second connection portion FX2.

In an exemplary embodiment, as shown in FIG. 5, the second portion P2 is interposed between the first portion P1 and the third portion P3.

In one exemplary embodiment, for example, a portion of the first connection portion FX1 has a curved shape.

In such an embodiment, the first connection portion FX1 is defined between the first portion P1 and the second portion P2 and has a curved surface which is curved around a first reference line (not shown) substantially parallel to the direction substantially parallel to the short sides.

The curved surface curved around the first reference line may be substantially parallel to the direction substantially parallel to the short sides. The shape of the first connection portion FX1 may not be limited to that shown in FIG. 5 and may have a variety of curved shapes around the first reference line.

In an exemplary embodiment, a portion of the second connection portion FX2 has a curved shape.

In such an embodiment, the second connection portion FX2 has a curved surface which is curved around a second reference line (not shown), which is defined between the second portion P2 and the third portion P3 and substantially parallel to the direction substantially parallel to the short sides.

The curved surface curved around the second reference line may be substantially parallel to the direction substantially parallel to the short sides. The shape of the second connection portion FX2 may not be limited to that shown in FIG. 5 and may have a variety of curved shapes around the second reference line.

Other elements of the display device shown in FIG. 5 may have the same structure and function as those of the display device 100 shown in FIG. 2, and thus any repetitive detailed description thereof will be omitted.

In an exemplary embodiment, as shown in FIG. 5, a triple-chassis structure, in which the first, second, and third portions P1, P2, and P3 are disposed to overlap each other in the vertical direction, may have a relatively large strength compared with the double-chassis structure shown in FIG. 2 and apply a relatively large tensile force to the light guide plate and the display panel. Accordingly, since the middle chassis 104 having the triple-chassis structure is disposed between the light guide plate 106 and the lower substrate 103, the curved display device may be more easily realized. In an exemplary embodiment, as described above with reference to FIG. 5, the middle chassis 104 may have the triple-chassis structure, but not being limited thereto. In an alternative exemplary embodiment, the middle chassis 104 may have four or more chassis.

Figure 6:
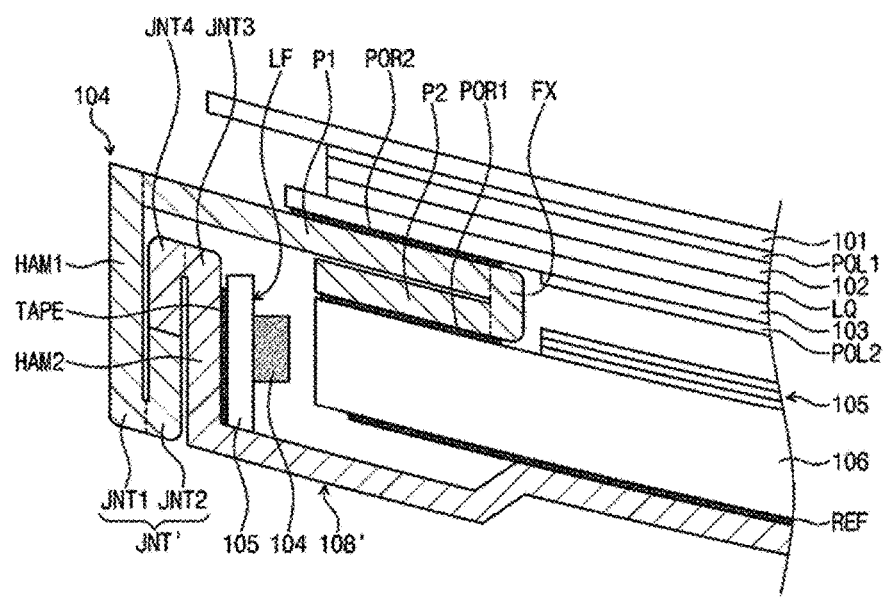
FIG. 6 is a partially enlarged cross-sectional view showing a display device according to another alternative exemplary embodiment of the disclosure.

FIG. 6 is a partially enlarged cross-sectional view showing a display device according to another alternative exemplary embodiment of the disclosure.

The display device shown in FIG. 6 has substantially the same structure and function as those of the display device shown in FIG. 3 except for an engaging portion JNT' and a bottom chassis 108'. Since the display device shown in FIG. 6 has substantially the same structure and function as those of the display device shown in FIG. 3 except for the engaging portion JNT' and the bottom chassis 108', any repetitive detailed descriptions of the same elements will be omitted for convenience of description. Hereinafter, the engaging portion JNT' and the bottom chassis 108' will be described in detail with reference to FIG. 6.

In an exemplary embodiment, as shown in FIG. 6, the engaging portion JNT' may not include the engaging recesses 109 and the bottom chassis 108' may not include the engaging hooks 112.

The engaging portion JNT' includes a first engaging portion JNT1 and a second engaging portion JNT2 extending from the first engaging portion JNT1 and overlapping at least a portion of the first engaging portion JNT1 in a horizontal direction.

The bottom chassis 108' includes a third engaging portion JNT3 and a fourth engaging portion JNT4 extending from the third engaging portion JNT3 and overlapping at least a portion of the first engaging portion JNT1 in the horizontal direction.

In an exemplary embodiment, the third engaging portion JNT3 and the circuit board 107 are coupled to each other by an adhesive member TAPE.

The first engaging portion JNT1 and the second engaging portion JNT2 are disposed to overlap each other when viewed in the horizontal direction and coupled to each other.

The third engaging portion JNT3 and the fourth engaging portion JNT4 are disposed to overlap each other when viewed in the horizontal direction and coupled to each other.

Each of the first and third engaging portions JNT1 and JNT3 overlaps the second and fourth engaging portions JNT2 and JNT4 when viewed in the horizontal direction.

The second and fourth engaging portions JNT2 and JNT4 overlap each other when viewed in the vertical direction.

One end of the second engaging portion JNT2 is coupled to one end of the fourth engaging portion JNT4.

In such an embodiment, as shown in FIG. 6, the one end of the second engaging portion JNT2 is in contact with the one end of the fourth engaging portion JNT4. In such an embodiment, the one end of the second engaging portion JNT2 may be coupled to the one end of the fourth engaging portion JNT4 by attaching the one end of the second engaging portion JNT2 to the one end of the fourth engaging portion JNT4 using an adhesive member.

In such an embodiment, where the engaging structure between the engaging recesses 109 and the engaging hooks 112 is replaced with the engaging structure between the one end of the second engaging portion JNT2 and the one end of the fourth engaging portion JNT4, the chassis structure having large strength for the curved display device may be realized.

Accordingly, the middle chassis 104 may be effectively prevented from being separated from the bottom chassis 108', and the chassis may be effectively prevented from being separated from the display device.

Figure 7:
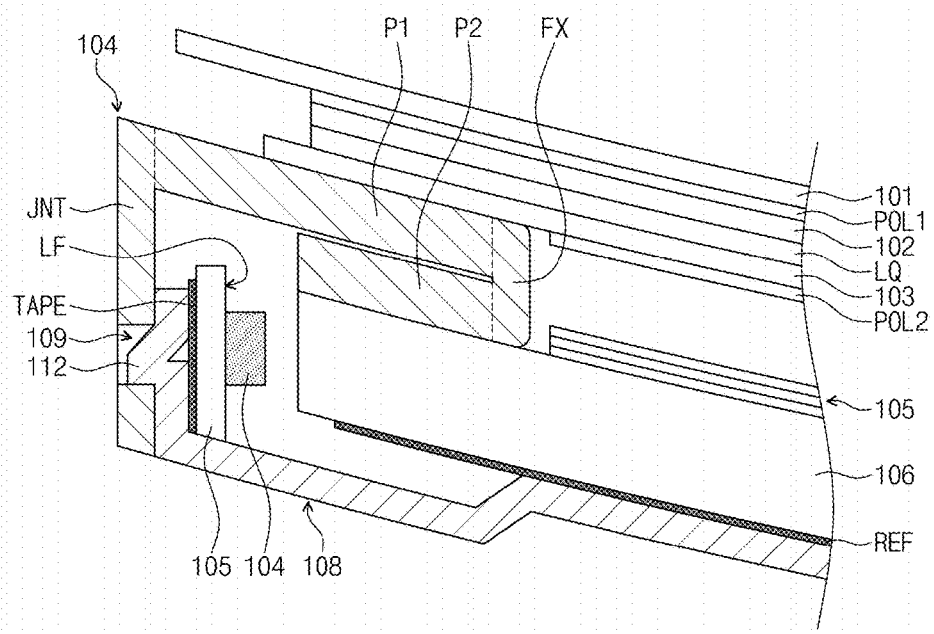
FIG. 7 is a partially enlarged cross-sectional view showing a display device according to another alternative exemplary embodiment of the disclosure.

FIG. 7 is a partially enlarged cross-sectional view showing a display device according to another alternative exemplary embodiment of the disclosure.

Referring to FIG. 7, in an exemplary embodiment, an engaging portion JNT has a thickness different from a thickness of the first portion P1. In such an embodiment, the thickness of the engaging portion JNT is different from that of the second portion P2.

In one exemplary embodiment, for example, the thickness of each of the first and second portions P1 and P2 is greater than the thickness of the engaging portion JNT.

In such an embodiment, where the first and second portions P1 and P2, which are desired to have a relatively large tensile force, have a relatively large thickness, which is larger than that of the engaging portion JNT, a material cost of the display device is reduced and the above-mentioned effect is achieved.

FIG. 8 is a flowchart showing an exemplary embodiment of a method of manufacturing a display device.

Referring to FIG. 8, in an exemplary embodiment of a method of manufacturing the display device 100, a chassis member (not shown) is provided (S1). The chassis member may be provided or formed by an injection molding method. The chassis member has a thin plate shape defined with long sides and short sides.

The chassis member includes a metal material. In one exemplary embodiment, for example, the chassis member includes aluminum (Al), iron (Fe), copper (Cu), a compound thereof, or a mixture thereof.

The chassis member includes the first portion P1, the second portion P2 and the first connection portion FX1 connecting the first portion P1 and the second portion P2.

In an exemplary embodiment, the first connection portion FX1 may be curved (or bent) to manufacture the middle chassis 104 as shown in FIG. 2 (S2). In such an embodiment, the first connection portion FX1 may be curved in a way such that the first portion P1 is disposed to overlap the second portion P2 in the vertical direction.

In an exemplary embodiment, the light guide plate 106 and the display panel DPA are coupled to the middle chassis 104 to allow the middle chassis 104 provided as describe above to be interposed between the light guide plate 106 and the display panel DPA (S3).

In such an embodiment, the light guide plate 106 and the display panel DPA may be coupled to the middle chassis 104 to allow the first and second portions P1 and P2 to be interposed between an end of the light guide plate 106 and an end of the display panel DPA The display device 100 shown in FIG. 2 may be manufactured through the operations S1 to S3.

In an exemplary embodiment, the surface of the first adhesive tape POR1 is attached to the light guide plate 106, and the opposing surface of the first adhesive tape POR1 is attached to the second portion P2 (S4). In such an embodiment, the surface of the second adhesive tape POR2 is attached to the display panel DPA, and the opposing surface of the second adhesive tape POR2 is attached to the first portion P1 (S5). The display device 100 shown in FIG. 3 may be manufactured through the operations S1 to S5.

In an exemplary embodiment, to manufacture the display device 100 including the middle chassis 104 of the triple-chassis structure shown in FIG. 5, the manufacturing method may further include bending the chassis member to define the second connection portion FX2 connecting the second portion P2 and the third portion P3 in a way such that the third portion P3 overlaps the first and second portions P1 and P2 in the vertical direction.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
 a light source;
 a light guide plate comprising a light incident surface facing the light source;
 a middle chassis disposed on the light guide plate; and
 a display panel disposed on the middle chassis,
 wherein the middle chassis comprises:
 a first portion;
 a connection portion extending from a first end of the first portion, the connection portion overlapping with the light guide plate in a vertical direction; and
 a second portion extending from the connection portion,
 wherein the second portion is spaced apart from at least a portion of the first portion by a predetermined distance in the vertical direction, and overlaps the portion of the first portion in the vertical direction.

2. The display device of claim 1, wherein the light guide plate is curved in a length direction and is not curved in a width direction, and the connection portion is curved around a reference line defined between the first portion and the second portion, the reference line being parallel to the width direction.

3. The display device of claim 2, wherein
 the light source is disposed at a position adjacent to a side of the light guide plate,
 the first portion overlaps the light source in the vertical direction, and
 the second portion is spaced apart from the light source when viewed in a plan view.

4. The display device of claim 3, further comprising:
 a circuit board comprising a mounting surface on which the light source is disposed,
 wherein a first end of the second portion is connected to the connection portion, and
 a second end of the second portion is disposed between a first imaginary surface extending from the light incident surface in the vertical direction and a second imaginary surface extending from the mounting surface in the vertical direction when viewed in a plan view.

5. The display device of claim 1, further comprising:
 a first adhesive tape; and
 a second adhesive tape,
 wherein the first portion is disposed on the second portion,
 a surface of the first adhesive tape is attached to the light guide plate,
 an opposing surface of the first adhesive tape is attached to the second portion,
 a surface of the second adhesive tape is attached to the display panel, and
 an opposing surface of the second adhesive tape is attached to the first portion.

6. The display device of claim 1, wherein the middle chassis further comprises a third portion extending from the second portion and overlapping the first and second portions in the vertical direction.

7. The display device of claim 6, wherein the second portion is disposed between the first and third portions.

8. The display device of claim 7, further comprising:
 a first connection portion connecting the first portion and the second portion; and
 a second connection portion connecting the second portion and the third portion,
 wherein the first connection is curved around a first reference line defined between the first portion and the second portion, and
 the second connection is curved around a second reference line defined between the second portion and the third portion.

9. The display device of claim 1, further comprising:
 a bottom chassis which defines an accommodating space to accommodate the light guide plate and the light source, wherein the middle chassis further comprises an engaging portion extending from a second end of the first portion and engaged with the bottom chassis.

10. The display device of claim 9, wherein
the engaging portion comprises:
a first engaging portion; and
a second engaging portion extending from the first engaging portion and overlapping at least a portion of the first engaging portion in a horizontal direction,
the bottom chassis comprises:
a third engaging portion; and
a fourth engaging portion extending from the third engaging portion and overlapping at least a portion of the third engaging portion in the horizontal direction, and
the second engaging portion is engaged with the fourth engaging portion.

11. The display device of claim 10, further comprising:
a circuit board on which the light source is disposed,
wherein the circuit board is coupled to the third engaging portion.

12. The display device of claim 9, wherein the first portion has a thickness different from a thickness of the engaging portion.

13. A backlight unit comprising:
a light source;
a light guide plate comprising a light incident surface facing the light source;
a bottom chassis which defined an accommodating space to accommodate the light guide plate and the light source; and
a middle chassis disposed on the light guide plate,
wherein the middle chassis comprises:
a first portion;
a connection portion extending from a first end of the first portion, the connection portion overlapping with the light guide plate in a vertical direction;
a second portion extending from the connection portion, spaced apart from at least a portion of the first portion by a predetermined distance in the vertical direction, and overlapping the portion of the first portion in the vertical direction; and
an engaging portion extending from a second end of the first portion and engaged with the bottom chassis.

14. The backlight unit of claim 13, further comprising:
an adhesive tape,
wherein the first portion is disposed above the second portion,
a surface of the adhesive tape is attached to the light guide plate, and
an opposing surface of the adhesive tape is attached to the second portion.

15. The backlight unit of claim 13, further comprising:
an adhesive tape,
wherein the first portion is disposed under the second portion,
a surface of the adhesive tape is attached to the light guide plate, and
an opposing surface of the adhesive tape is attached to the first portion.

16. The backlight unit of claim 13, further comprising:
a plurality of optical sheets,
wherein the plurality of optical sheets are disposed above the light guide plate and spaced apart from the first and second portions when viewed in a plan view.

17. The backlight unit of claim 13, wherein the middle chassis further comprises a third portion extending from the second portion and overlapping the first and second portions in the vertical direction.

18. A method of manufacturing a display device, the method comprising:
providing a chassis member;
forming a middle chassis from the chassis member; and
coupling the middle chassis to a light guide plate and a display panel such that the middle chassis overlaps an end of the light guide plate and an end of the display panel in a vertical direction,
wherein the forming the middle chassis comprises bending the chassis member to define a first connection portion connecting a first portion of the chassis member and a second portion of the chassis member in a way such that the first connection portion overlaps the light guide plate in the vertical direction and the first portion overlaps the second portion in the vertical direction and the second portion is spaced apart from at least a portion of the first portion by a predetermined distance in the vertical direction.

19. The method of claim 18, wherein
the first portion is disposed on the second portion, and
the coupling the middle chassis comprises:
attaching a surface of a first adhesive tape to the light guide plate;
attaching an opposing surface of the first adhesive tape to the second portion;
attaching a surface of a second adhesive tape to the display panel; and
attaching an opposing surface of the second adhesive tape to the first portion.

20. The method of claim 18, wherein the forming the middle chassis further comprises bending the chassis member to define a second connection portion connecting the second portion and a third portion in a way such that the third portion overlaps the first and second portions in the vertical direction.

* * * * *